Patented May 10, 1949

2,469,883

UNITED STATES PATENT OFFICE 2,469,883

PREPARATION OF METHYL SILICONE ELASTOMERS

James Marsden and George F. Roedel, Schenectady, N. Y., assignors to General Electric Company, a corporation of New York No Drawing. Application June 11, 1945, Serial No. 598,913

4 Claims. (Cl. 260—46.5)

The present invention relates to the preparation of methyl silicone elastomers. It is particularly concerned with the preparation of the dimethyl silicone, i. e., dimethyl polysiloxane, gums employed in the making of silicone elastomers by treating or advancing liquid low molecular weight dimethyl silicones to the solid elastic state with sulphuric acid or chlorosulphonic acid.

Methyl silicone elastomers and methods of preparing such elastomers are described in the copending application of Maynard C. Agens, Serial No. 526,473, and the copending application of James G. E. Wright and Curtis S. Oliver, Serial No. 526,472, both of which applications were filed March 14, 1944, and assigned to the same assignee as the present invention, and which are now respectively Patent Number 2,448,756 and 2,448,565. Silicone elastomers specifically containing monomethyl-, dimethyl-, and trimethyl-substituted silicon atoms are described and claimed in the copending application Serial No. 598,914, now Patent Number 2,457,688, filed concurrently herewith in the names of Robert H. Krieble and John R. Elliott, and assigned to the same assignee as the present invention. Briefly described, these silicone elastomers generally comprise (1) methyl silicone gums obtained by treating liquid methyl silicones having a methyl-to-silicon ratio of from 1.98 to 2.00 with ferric chloride, mixtures of ferric oxide and aluminum chloride, etc., and (2) suitable fillers. As disclosed in the above-identified Wright and Oliver application, the aforementioned liquid methyl silicones may be alternatively described as being a liquid polymeric dimethylsiloxane containing up to 2 mol per cent copolymerized monomethylsiloxane and having a methyl-to-silicon ratio of from 1.98 to 2.00. The gums which also have methyl-to-silicon ratios ranging from 1.98 to 2.00 are prepared from liquid polymeric silicones, i. e., polysiloxanes, or mixtures thereof, which in turn can be obtained by hydrolysis of a pure or a substantially pure dimethyl silane having the formula $(CH_3)_2SiX_2$, where $X$ represents a hydrolyzable group such as a halogen or alkoxy radical, or mixtures thereof with a hydrolyzable monomethyl silane of the formula $CH_3SiX_3$. Since little if any change in the average methyl-to-silicon ratio takes place during hydrolysis of the silanes and the conversion of the hydrolysis products to a gum, the percentage proportions of the monomethyl-, dimethyl-, and, if such are present, the trimethyl-substituted silicon atoms in the gum will be the same as the mol per cent of the various methyl-substituted silanes in the original silane mixture. To obtain elastomers which can be rapidly cured, for example, in a closed mold, small amounts of benzoyl peroxide or other suitable curing agent are added to the gum filler mixture at the time the gum and filler are worked on the rubber rolls. In the cured or vulcanized state the resultant elastomers possess some of the properties of vulcanized natural rubber and are particularly characterized by their flexibility at low temperatures and their resistance to heat.

The present invention is based on the discovery that gums suitable for the preparation of elastomers can be made by treating liquid dimethyl silicones having methyl-to-silicon ratios within the above range with sulphuric or chlorosulphonic acid at normal or elevated temperatures. As will be evident from the examples given hereinafter the concentration of the sulphuric acid, the amount employed, the degree of dispersion of the acid in the liquid silicone, and the temperature at which the polymerization is carried out are important factors governing the time necessary to give the desired high polymeric silicone gum.

In accordance with the preferred practice, the acid is washed from the gum before the latter is mixed with fillers, benzoyl peroxide, etc., in the preparation of the elastomer.

In order that those skilled in the art better may understand how the present invention can be carried into effect, the following illustrative examples are given:

EXAMPLE 1

This example illustrates the conversion of a dimethyl silicone oil to a gum at room temperature by means of concentrated sulphuric acid (about 36 N).

The methyl polysiloxane oil used in this sample consisted of 99.6 per cent dimethyl-substituted silicon atoms (dimethyl silicon units) and 0.4 per cent monomethyl-substituted silicon atoms (monomethyl silicon units). Twenty gram portions of the oil were shaken for 40 hours with the amounts of concentrated sulphuric acid given in the following table:

Table I

| Sample | Weight of Silicone Oil | Weight Conc. $H_2SO_4$(36 N) | After 40 Hours |
|---|---|---|---|
| | Grams | Grams | |
| A | 20 | 0.1 | gum. |
| B | 20 | 0.2 | Do. |
| C | 20 | 0.4 | Do. |
| D | 20 | 0.8 | Do. |
| E | 20 | 1.5 | viscous liquid. |

By treating the viscous liquid product E with water in an amount such that the over-all concentration of sulphuric acid became less than 75 per cent, preferably about 66 per cent, a gum suitable for preparation of elastomers was obtained. Little visual change occurred in the properties of the above samples between 16 and 40 hours with the exception of sample A, which increased slightly in viscosity or stiffness.

The gum products of Example 1 lost considerable weight on heating at elevated temperatures, e. g. at about 200° C. However, the weight loss of the gums can be reduced substantially by washing the gums prior to the preparation of the elastomer or by milling lead oxide into the gums during the preparation of the elastomer. The following example illustrates the effectiveness of lead oxide in prolonging the life of a silicone elastomer comprising a silicone gum containing sulphuric acid. It also illustrates the effect of elevated temperatures on the rate of conversion of the oil to a gum.

Example 2

One hundred grams of polysiloxane oil of the same composition as that used in Example 1 was polymerized to a solid gum by heating it with 0.5 per cent of 36 N sulphuric acid at an elevated temperature (about 123° C.) for two hours. To 100 parts of the resultant silicone gum was added 1.14 parts of lead oxide (PbO) which was sufficient to react with all the sulphuric acid present in the gum. To this mixture was added 200 parts of titanium dioxide and 2 parts of benzoyl peroxide. After the necessary milling the elastomer stock was pressed and vulcanized in the usual manner, resulting in a silicone elastomer.

A sample for control purposes was prepared in the same manner as that just described except no lead oxide was added to the gum.

The physical properties of these two elastomeric products are given in the table below:

Table II

| Cure | Hardness | Elongation | Tensile, Lbs./Sq. In. |
|---|---|---|---|
| Without lead oxide: | | Per cent | |
| After pressing | 30 | 300 | 278 |
| 12 hours at 200° C | 35 | 150 | 300 |
| 24 hours at 200° C | 40 | 200 | 372 |
| 72 hours at 200° C | 42 | 200 | 364 |
| 6 days at 200° C | 46 | 140 | 386 |
| 4 weeks at 200° C | 67 | | |
| With lead oxide: | | | |
| As pressed | 20 | 185 | 412 |
| 12 hours at 200° C | 25 | 140 | 425 |
| 24 hours at 200° C | 30 | 140 | 500 |
| 72 hours at 200° C | 33 | 120 | 530 |
| 6 days at 200° C | 39 | 90 | 380 |
| 4 weeks at 200° C | 53 | 100 | 380 |

In this and subsequent examples, the hardness of the samples was measured by means of a Shore "A" durometer. After being heated for 4 weeks at 200° C. the elastomer to which lead oxide was added was more flexible. For example, a sheet of this elastomer on bending through 180 degrees did not break whereas a sheet of the elastomer containing no lead oxide broke on the same test.

Chlorosulphonic acid can also be used in place of sulphuric acid to polymerize a liquid silicone to a solid gum. As little as 0.1% of chlorosulphonic acid will convert a silicone oil to a gum within two days. The following example illustrates the preparation of an elastomer by means of this compound.

Example 3

One hundred and twenty-five parts by weight of a dimethyl silicone oil in which 0.2% of the silicon atoms were connected to only one methyl group was stirred with 0.3 part chlorosulphonic acid and polymerization allowed to continue for 12 days. The final product was a tough, slightly sticky gum. 100 parts of this gum was milled with 200 parts titanium dioxide, 1 part lead oxide, and 2 parts benzoyl peroxide and then molded for 10 minutes at 150° C. The product had a Shore A durometer hardness of 45, an elongation of 200 per cent and a tensile strength of 410 lbs./sq. in. After further cure in an oven at 150° C. for 15 hours, the product had a hardness of 54, an elongation of 150 per cent and a tensile strength of 570 lbs./sq. in.

When a substantial amount of sulphuric acid having a concentration less than 36 N is employed to convert dimethyl silicone oils to gums, the time necessary for the conversion has been found to vary directly as the concentration of acid up to the range 26 N to 28 N. If the normality is greater than the above range the polymeric product remains a viscous liquid. However, on dilution of the aqueous phase to 25 N sulphuric acid or less the liquid polymer is converted to a solid gum. While we have prepared gums by the use of solutions of acid having concentrations as low as between 14 or 15 N, for commercial purposes we prefer to use a solution of acid at least as concentrated as 20 N.

Example 4

This example indicates the time necessary for the formation of solid gums by polymerization of octamethyltetrasiloxane with different concentrations of sulphuric acid. 20 g. portions of the tetrasiloxane were shaken with equal weights of sulphuric acid of the concentrations given in the table below.

Table III

| Normality of $H_2SO_4$ | | Gum Formed |
|---|---|---|
| 14.4 N | days | 94–109. |
| 18.3 N | hours | 264–312. |
| 20.9 N | do | 32–40. |
| 22.95 N | do | 15–24. |
| 25.6 N | do | 2–4. |

It has been found that the better dispersion of the sulphuric acid in the silicone, obtainable by addition of a wetting agent, results in a faster rate of reaction leading to the formation of a gum. For example, 1000 g. of 23.6 N sulphuric acid were added to 150 g. of octamethyltetrasiloxane, shaken vigorously by hand and then placed on a shaking machine. After shaking for a short time most of the sulphuric acid medium separated, although some droplets of sulphuric acid remained dispersed in the silicone. A gum formed between 210–240 minutes. In a second experiment, the same amount of octamethyltetrasiloxane and sulphuric acid was used to which was added an emulsifying agent, specifically, a polyoxyalkylane derivative of sorbitan monopalmitate of viscosity 400–600 cp. at 25° C. This mixture was stirred vigorously for 20 minutes. An excellent emulsion was obtained, and at the end of this time some solid polymer was noted. This emulsion was drained into a bottle and placed on the shaking machine. After 20 minutes shaking, coalescence of the gum into balls about ½ inch in diameter occurred. The sulphuric acid which separated from the gum was first drained off and the gum, which still contained dispersed sulphuric acid, was added to a mixture of toluene and an aqueous solution of sodium bicarbonate. The gum completely dissolved in the toluene so that the sulphuric acid could be and was neutralized and washed out readily and completely. On removal of the solvent, a soft plastic polymeric silicone gum resulted. The data given in the table below show that a gum prepared in the above manner loses little weight even after prolonged heating at 200° C.

Table IV

| Sample | Per Cent Weight Loss at 200° C. | | | | | |
|---|---|---|---|---|---|---|
| | 1 hr. | 5 hrs. | 11 hrs. | 75 hrs. | 219 hrs. | 43 days |
| Washed H₂SO₄ Gum | 0.9 | 1.36 | 1.48 | 1.60 | 1.80 | 3.43 |

A solid elastomer was prepared from the above gum using 100 parts of gum to which were added 200 parts of titanium dioxide and 2 parts of benzoyl peroxide. Milling and pressing were done in the usual manner. The properties of the elastomer are given in Table V.

Table V

| Cure | Shore Hardness | Elongation | Tensile, Lbs./Sq. In. |
|---|---|---|---|
| | | Per cent | |
| As pressed | | 310 | 650 |
| 12 hrs. at 200° C | 29 | 216 | 700 |
| 24 hrs. at 200° C | 32 | 255 | 860 |
| 72 hrs. at 200° C | 40 | 255 | 750 |

EXAMPLE 5

The method of removing the sulphuric acid outlined in Example 4 is not possible with insoluble gums. These gums may be washed effectively and quickly on corrugated rolls such as are used for washing other elastomers. For example, a gum prepared from 300 parts of a dimethyl silicone oil containing 0.4 per cent monomethyl-substituted silicon atoms by treatment with 300 parts of 23.6 N sulphuric acid was quickly and efficiently washed by milling the gum on the washing rolls over which was passed a continuous stream of water. This washed gum lost only 3.8 per cent of its weight when heated at 200° C. for 34 days which is comparable to the weight loss of the acid free gum described in Example 4. A gum prepared in a similar manner which was washed inefficiently so that considerable sulphuric acid remained in the gum lost approximately 85 per cent in a much shorter time when heated. A silicone elastomer made from the washed gum in the same manner as described in Example 4 had comparable properties.

Both soluble and insoluble gums may be made in a system containing monomethyl-, dimethyl-, and trimethyl-substituted silicon atoms; in order to prepare a soluble gum the relative amounts of the three component mixture must be held within narrow limits. The following example illustrates the preparation of solid polymers or gums consisting of monomethyl-, dimethyl-, and trimethyl-substituted silicon atoms.

EXAMPLE 6

A solid gum was prepared by copolymerization of a dimethyl polysiloxane containing 0.3 mol per cent trimethylsiloxane with a dimethyl polysiloxane oil containing 7.6 mol per cent monomethylsiloxane, the composition of the resulting mixture was 0.18 mol per cent trimethylsiloxane, 0.45 mol per cent monomethylsiloxane and 99.37 mol per cent dimethylsiloxane. This mixture to which was added 4 cc. of 36 N sulphuric acid was shaken for 16 hours. On addition of 100 cc. of 20 N sulphuric acid a solid gum was formed. This gum was washed in the same manner as that described in Example 5. An elastomer was prepared from this gum using 100 parts of gum to which were added 200 parts of titanium dioxide and 4 parts of benzoyl peroxide. Milling and pressing were done in the usual manner. The pressed sheet after additional heating in air for 72 hours at 200° C. had a tensile strength of 265 p. s. i., 85 per cent elongation, and a Shore hardness of 42.

A dimethyl silicone oil dissolves in concentrated (36 N) sulphuric acid to form a one phase system and when a solution of this type is hydrolyzed in water, a liquid silicone polymer is formed. However, we have found that if such a solution of silicone oil in 36 N sulphuric acid is hydrolyzed in relatively low concentration of sulphuric acid, polymeric products of different molecular weight ranging from liquids to solid gums are formed; the higher the concentration of sulphuric acid, up to 75 per cent, in the hydrolyzing bath the greater is the molecular weight of the resulting silicone polymer. In addition, the liquid silicone polymers thus prepared may be converted to solid silicone gums with relatively low concentrations of sulphuric acid in a much shorter time than original liquid silicone with the same concentration of sulphuric acid.

EXAMPLE 7

One hundred grams of a methyl silicone oil consisting of monomethyl- and dimethyl-substituted silicon atoms and having an average methyl-to-silicon ratio of 1.996 was dissolved in 125 grams of 36 N sulphuric acid. 100 grams of this solution on being dropped slowly into 1600 grams of 14.4 N sulphuric acid formed a solid silicone gum. The 14.4 N concentration of sulphuric acid did not condense a silicone oil of the same composition to a gum even after shaking for 48 hours.

EXAMPLE 8

One hundred and fifty grams of octamethylcyclotetrasiloxane was dissolved in 150 grams of 36 N sulphuric acid. 150 grams of this solution was dropped slowly into 2000 grams of water. To 20 grams of the liquid silicone product, after removal of the aqueous phase, was added 20 grams of 14.2 N sulphuric acid. After shaking between 17 and 65 hours at room temperature the silicone was converted to a solid gum. This time is much shorter than that required to convert the tetrasiloxane to a solid gum with the same concentration of sulphuric acid by the process of Example 4.

While the invention has been particularly described with reference to silicone elastomers containing titanium dioxide as a filler, it is to be understood that it is not limited thereto. The gums prepared in accordance with the present invention may be substituted directly for any of the previously known gums in the preparation of silicone elastomers. Various fillers which can be incorporated into the elastomers and representative uses for the elastomers are given for example in the aforementioned Wright and Oliver applications.

What we claim as new and desire to secure by Letters Patent of the United States is:

1. The process of preparing a solid, elastic, curable methylpolysiloxane which comprises advancing a liquid methylpolysiloxane containing an average of from 1.98 to 2.00 methyl groups per silicon atom, and consisting essentially of a liquid polymeric dimethylsiloxane containing up to 2 mol per cent copolymerized monomethylsiloxane to the solid, elastic, curable state with an agent consisting solely of an acidic material selected from the class consisting of sulfuric acid and chlorosulfonic acid, and thereafter removing substantially all of the acidic material from the solid elastic product.

2. The process of preparing a solid, elastic, curable methylpolysiloxane which comprises advancing a liquid methylpolysiloxane containing an average of from 1.98 to 2.00 methyl groups per silicon atom and consisting essentially of a liquid polymeric dimethylsiloxane containing up to 2 mol per cent copolymerized monomethylsiloxane with an agent consisting solely of a sulphuric acid solution having a concentration of from 15 N to 36 N, by agitating said liquid polysiloxane mixture with the sulfuric acid solution until the liquid methylpolysiloxane is advanced to the solid, elastic, curable state, and thereafter washing the resulting solid elastic product to remove substantially all the acid therefrom.

3. The process of preparing a solid, elastic, curable methylpolysiloxane which comprises advancing a liquid methylpolysiloxane containing an average of from 1.98 to 2.00 methyl groups per silicon atom and consisting essentially of a liquid polymeric dimethylsiloxane containing up to 2 mol per cent copolymerized monomethylsiloxane to the solid, elastic, curable state with an acidic material consisting solely of chlorosulfonic acid, and thereafter removing substantially all of the acidic material from the formed solid elastic product.

4. The process of preparing a solid, elastic, curable methyl polysiloxane which comprises advancing a liquid polymeric dimethylsiloxane containing up to 2 mol per cent copolymerized monomethylsiloxane and having a methyl-to-silicon ratio of from 1.98 to 2.00 by means of an agent consisting solely of aqueous sulfuric acid, by dissolving said siloxane in concentrated sulfuric acid, adding the resulting solution to an aqueous medium containing not over 75 per cent, by weight, sulfuric acid, and advancing the liquid methyl polysiloxane to the solid, elastic, curable state, and thereafter removing substantially all of the acid from the solid, elastic product.

JAMES MARSDEN.
GEORGE F. ROEDEL.

REFERENCES CITED

The following references are of record in the file of this patent:

UNITED STATES PATENTS

| Number | Name | Date |
| --- | --- | --- |
| 2,258,218 | Rochow | Oct. 7, 1941 |
| 2,371,068 | Rochow | Mar. 6, 1945 |
| 2,397,895 | Warrick | Apr. 2, 1946 |
| 2,432,891 | Hervey | Dec. 16, 1947 |
| 2,437,204 | McGregory et al. | Mar. 2, 1948 |
| 2,438,478 | Hyde | Mar. 23, 1948 |
| 2,448,756 | Agens | Sept. 7, 1948 |

FOREIGN PATENTS

| Number | Country | Date |
| --- | --- | --- |
| 113,708 | Australia | Sept. 14, 1941 |

OTHER REFERENCES

Atlas Powder Co., "Atlas Spans and Atlas Tweens," June 1945, page 2.

Rochow et al.: J. Amer. Chem. Soc., vol. 63, March 1941, pp. 798 to 800.

Hyde et al.: J. Amer. Chem. Soc., vol. 63, May 1941, pp. 1194 to 1196.